US010295986B2

(12) United States Patent
Saitou et al.

(10) Patent No.: US 10,295,986 B2
(45) Date of Patent: May 21, 2019

(54) NUMERICAL CONTROLLER

(71) Applicant: FANUC CORPORATION, Minamitsuru-gun, Yamanashi (JP)

(72) Inventors: Takuya Saitou, Yamanashi (JP); Toshinori Matsukawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/691,972

(22) Filed: Aug. 31, 2017

(65) Prior Publication Data
US 2018/0067471 A1 Mar. 8, 2018

(30) Foreign Application Priority Data
Sep. 6, 2016 (JP) .................. 2016-173761

(51) Int. Cl.
G05B 19/406 (2006.01)
G05B 19/4093 (2006.01)
G06N 20/00 (2019.01)
G06N 99/00 (2019.01)
G06N 3/08 (2006.01)

(52) U.S. Cl.
CPC ..... *G05B 19/406* (2013.01); *G05B 19/40932* (2013.01); *G06N 3/084* (2013.01); *G06N 20/00* (2019.01); *G06N 99/005* (2013.01); G05B 2219/33321 (2013.01); G05B 2219/49307 (2013.01)

(58) Field of Classification Search
CPC ........ G06N 99/005; G05B 2219/32257; G05B 2219/33321; G05B 2219/49307
See application file for complete search history.

(56) References Cited

U.S. PATENT DOCUMENTS 5,361,308 A * 11/1994 Lee .................... G01B 11/2441
348/131
6,401,004 B1 * 6/2002 Yamazaki ........ G05B 19/40937
318/568.1

FOREIGN PATENT DOCUMENTS

JP          2000-198047 A       7/2000

* cited by examiner

*Primary Examiner* — Mark A Connolly
(74) *Attorney, Agent, or Firm* — RatnerPrestia

(57) ABSTRACT

A numerical controller which controls a machine tool acquires tool information including a shape of a tool, a machining condition in machining, and information related to a machining result of a workpiece after machining. A machine learning device performs machine learning on tendency of the information related to a machining result with respect to the tool information and the machining condition based on the tool information and the machining condition used as input data and based on the information related to a machining result used as teacher data, so as to construct a learning model. The machine learning device determines whether or not a machining result is good by using the learning model based on the tool information and the machining condition before the machine tool machines a workpiece.

2 Claims, 9 Drawing Sheets

FIG.1
[LEARNING PHASE]
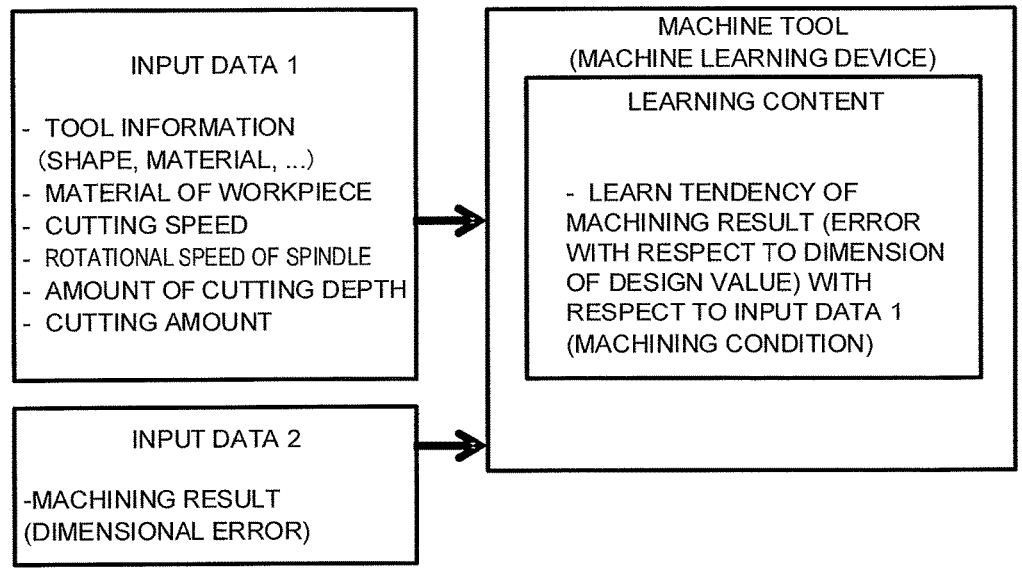
[OPERATION PHASE]
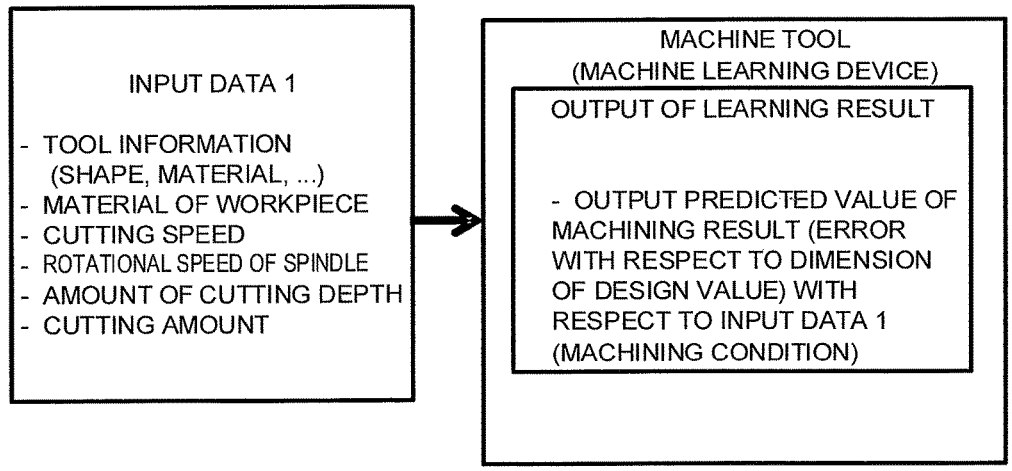

FIG.3
| NUMBER | REPRESENTATIVE IMAGE OF TOOL SHAPE | NOTES |
|---|---|---|
| 1 |  | TURNING TOOL (NEW ARTICLE) |
| 2 |  | TURNING TOOL (CUTTING EDGE IS ABRADED BY 1 mm) |
| 3 |  | TURNING TOOL (CUTTING EDGE IS ABRADED BY 2 mm) |
| 4 |  | TURNING TOOL (CUTTING EDGE IS CRACKED) |
| ... | ... | ... |
| NUMBER | WORKPIECE MATERIAL |
|---|---|
| 1 | IRON |
| 2 | STEEL |
| 3 | ALUMINUM |
| 4 | NICKEL |
| ... | ... |

OPERATION IN LEARNING PHASE

OPERATION IN OPERATION PHASE

NUMERICAL CONTROLLER

BACKGROUND OF THE INVENTION

1. Field of the Invention

The present invention relates to a numerical controller, and especially relates to a numerical controller which learns a tool state causing machining defects.

2. Description of the Related Art

As for a general tool used in machining, a cutting edge is abraded away and cutting resistance is increased with the elapse of machining time, and eventually the tool is broken. Further, machining accuracy is degraded along with progress of abrasion and accordingly, it becomes impossible to maintain predetermined machining accuracy required for a workpiece. In order to avoid such matter of tools, whether or not a tool has reached the end of life is determined mainly at the following timing, and tool exchange is performed when it is determined that the tool has reached the end of life.

- At a time at which the number of times or time in which the tool is used exceeds a certain number (life value)
- At a time at which it is found that an abrasion amount exceeds a certain number by measuring the tool length
- At a time at which an operator determines that the tool has reached the lifetime limit by visually checking the tool or a machined workpiece
- At a time at which breakage or chipping is recognized by checking a load of a spindle As the prior art technique for determining whether or not a tool has reached the end of life, Japanese Patent Application Laid-Open No. 2000-198047, for example, discloses a technique in which the abrasion amount after machining is calculated based on a tool shape, a cutting condition, and an uncut amount of a workpiece so as to determine a reach to an end of a tool life before machining.

However, the above-mentioned method for determining a tool life has various problems. In the method for determining a tool life based on the number of times or time in which the tool is used, a lifetime value is commonly set by more than enough number of times of use or use time so as to avoid machining defects or breakage, so that the tool is often still usable and thus the cost is wasted. The method for determining a tool life based on the tool length of a tool has such a problem that it is impossible to detect cracks of a chip in the case where there are a plurality of blades or where a blade is positioned at the end. Further, in the case of a tool whose life is determined based on abrasion on a portion other than the end portion, such as a tapping tool, it is impossible to determine a tool life by measurement of the end portion. In the method for determining a tool life based on operator's visual check of a machined workpiece, an operator having technical knowledge needs to perform the operation and thus, this method is not suitable for an unattended operation. In the method for determining a tool life by checking a spindle load, slight chipping hardly causes change of the spindle load, causing difficulty in accurate detection.

Further, in the above-mentioned method for determining a tool life described in Japanese Patent Application Laid-Open No. 2000-198047, accuracy in determination of a tool life is enhanced by considering a tool shape, a cutting condition, and an uncut amount of a workpiece. However, the tool life cannot be determined merely based on the abrasion amount of a tool. The tool life is affected also by a material of the tool, a position of abrasion, an abrasion state (chipping, for example), and the like. Thus, the technique of Japanese Patent Application Laid-Open No. 2000-198047 still has a problem that the technique cannot cope with various situations.

SUMMARY OF THE INVENTION

An object of the present invention is to provide a numerical controller which enables highly-accurate tool life determination.

In the present invention, the above-mentioned problems are solved by providing a numerical controller with a function for learning a relationship between a machining condition and a machining result through supervised learning and improving input data based on the obtained learning result. The numerical controller according to the present invention is capable of continuing a machining operation while keeping a certain level of quality by improving input data based on learning results.

A numerical controller according to the present invention controls a machine tool which machines workpiece with a tool and includes: a shape data acquisition unit which acquires tool information including a shape of the tool; a machining condition acquisition unit which acquires a machining condition in the machining of the workpiece; a machining result acquisition unit which acquires information related to a machining result of the workpiece after the machining of the workpiece; and a machine learning device which performs machine learning on tendency of the information related to a machining result with respect to the tool information and the machining condition based on the tool information and the machining condition used as input data and based on the information related to a machining result used as teacher data, so as to construct a learning model. The machine learning device is configured to determine whether or not a machining result is good by using the constructed learning model based on the tool information acquired by the shape data acquisition unit and the machining condition acquired by the machining condition acquisition unit, before the machine tool machines the workpiece.

The machine learning device may construct a learning model by a multilayer neural network.

Thus, the numerical controller according to the present invention has the above-mentioned configuration. Accordingly, reduction in tool cost can be expected due to improvement of tool life determination and an unattended continuous operation can be assisted.

BRIEF DESCRIPTION OF THE DRAWINGS

FIG. 1 illustrates an outline of machine learning and application of a learning result by a machine learning device which is introduced to a numerical controller in the present invention.

FIG. 3 illustrates numbering of images, sectional views, and materials of tools, and numbering of materials of a workpiece.

DETAILED DESCRIPTION OF THE PREFERRED EMBODIMENT

FIG. 1 illustrates an outline of machine learning and application of a learning result by a machine learning device which is introduced to a numerical controller in the present invention. The machine learning device introduced to the numerical controller according to the present invention operates in two phases which are a learning phase and an operation phase.

In the learning phase, the machine learning device introduced to the numerical controller according to the present invention uses, as input data, machining conditions such as tool information, a material of a workpiece, a cutting speed, a rotational speed of a spindle, an amount of cutting depth, and a cutting amount and a machining result such as a dimensional error of a workpiece machined based on the machining conditions so as to learn tendency of the machining result with respect to the machining conditions.

In the operation phase, the numerical controller according to the present invention provides machining conditions as input data to the machine learning device. The machine learning device outputs a predicted value of a machining result with respect to inputted machining conditions based on the tendency of the machining result with respect to the machining conditions, which is learned in the learning phase. Then, the numerical controller refers to the predicted value of a machining result outputted from the machine learning device so as to determine whether or not a failure will occur in a machining to be performed from now.

In the numerical controller according to the present invention, the learning phase and the operation phase of the machine learning device may be executed at totally different timing or may be executed in parallel. For example, after the machine learning device may be allowed to sufficiently perform learning in the learning phase, the operation may be performed by using only the learning results without execution of new learning, that is, by repeatedly using the same data, in actual machining by a machine tool. Alternatively, the operation may be performed so that more accurate evaluation values are searched (learned) while machining.

Further, the machine learning device may be built in the numerical controller of a machine tool or may be built in a PC connected to the numerical controller.

Figure 2:
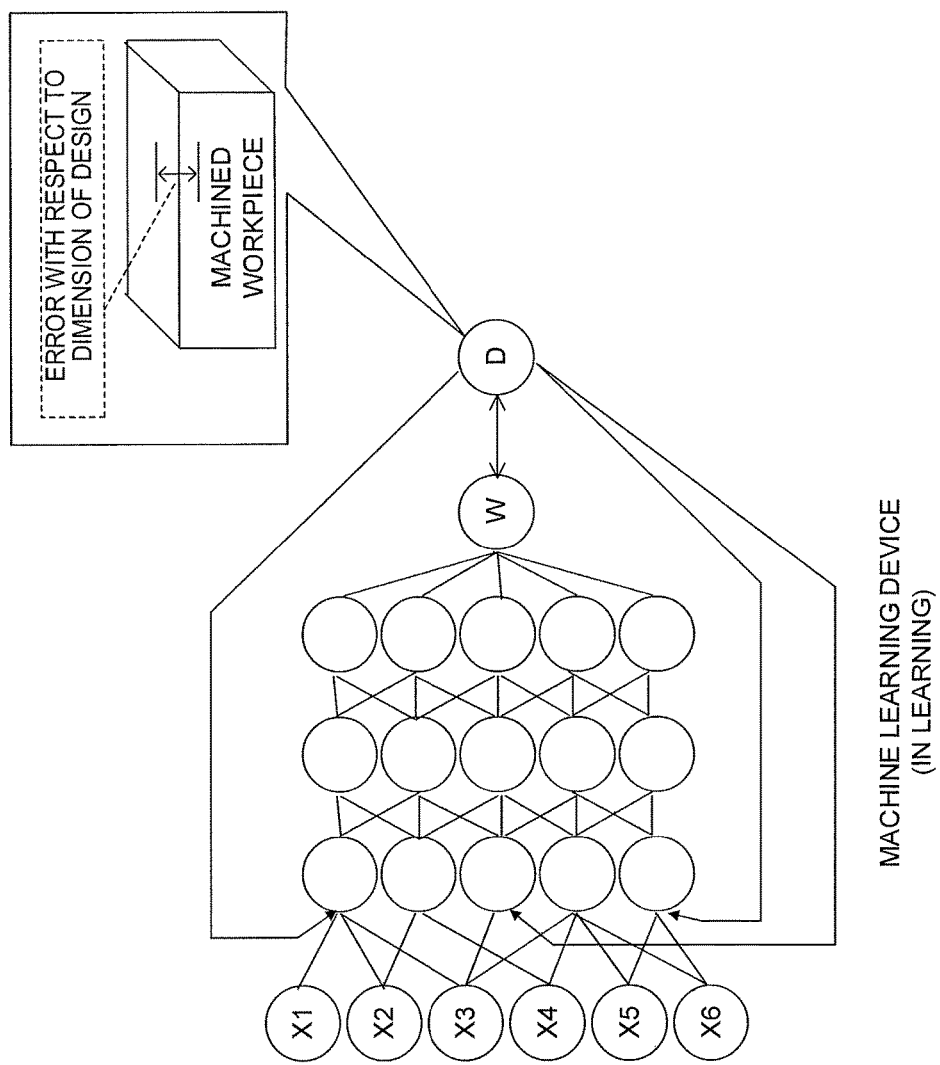
FIG. 2 illustrates a configuration example (learning phase) of the machine learning device introduced to the numerical controller according to the present invention.

FIGS. 2 and 3 illustrate a configuration example of the machine learning device introduced to the numerical controller according to the present invention. FIGS. 2 and 3 show the configuration in which a multilayer neural network is used as the machine learning device. The multilayer neural network is constituted of an arithmetic device, a memory, and the like which realize a neural network formed in imitation of a model of a neuron.

As illustrated in FIG. 2, in the case where the multilayer neural network is used as the machine learning device of the numerical controller according to the present invention, the numerical controller of the present invention inputs machining conditions into the machine learning device as input data (X1 to X6 in the example illustrated in FIG. 2) before machining at each step (or at a time when a tool or a cutting condition is changed or arbitrary timing) in the learning phase. Examples of the machining condition include tool information (image, sectional view, material), a material of a numbered workpiece, a cutting speed (composite speed), a rotational speed of a spindle, an amount of cutting depth, and a cutting amount. Here, as for an image, a sectional view, or a material of a tool and a material of a workpiece, a plurality of typical image data and material data may be preliminarily numbered and stored as illustrated in FIG. 3 and the numbers may be used as input data with respect to the machine learning device. Accordingly, the number of input data can be reduced and the structure of the multilayer neural network can be simplified.

Subsequently, the numerical controller according to the present invention acquires output data W, which is outputted from the machine learning device when the machining conditions serving as input data are inputted into the multilayer neural network, as a predicted machining result. Further, after a workpiece is machined based on the machining conditions inputted into the multilayer neural network, the numerical controller acquires the dimension of the machined workpiece, the number and the size of cutter marks, and the like as a machining result and calculates an error D between the acquired machining result and a design as teacher data. The numerical controller may automatically measure a dimension of the machined workpiece, the number and the size of cutter marks, and the like by controlling a measuring instrument, for example, or an operator may perform measurement of the machined workpiece and input the measured result into the numerical controller.

Then, the numerical controller according to the present invention allows the machine learning device to perform machine learning on the machining results with respect to the machining conditions based on the machining conditions serving as input data, the predicted machining result outputted from the multilayer neural network, and the error D (teacher data) between the dimension of the machined workpiece serving as the acquired machining result and the design so as to construct a learning model. Since the learning method (back propagation or the like) is already well known as a prior art technique related to a neural network, detailed description thereof will be omitted in this specification. The learning is performed until a distance between output data and a machining result is settled within a predetermined certain value. The distance is calculated by using a loss function. As an example of the loss function, a square error ($L_2$ loss) as expressed in formula (1) below may be used in the case where an error between a dimension of a machined workpiece and a design value is focused on, for example. Further, in the case where presence of a cutter mark is focused on, a logic function merely expressing whether or not there is a cutter mark may be used. Furthermore, any function may be used as long as the function can appropriately express a loss.

$$L(y(X_n;W),D)=(y(X_n;W)-D)^2 \qquad (1)$$

Figure 4:
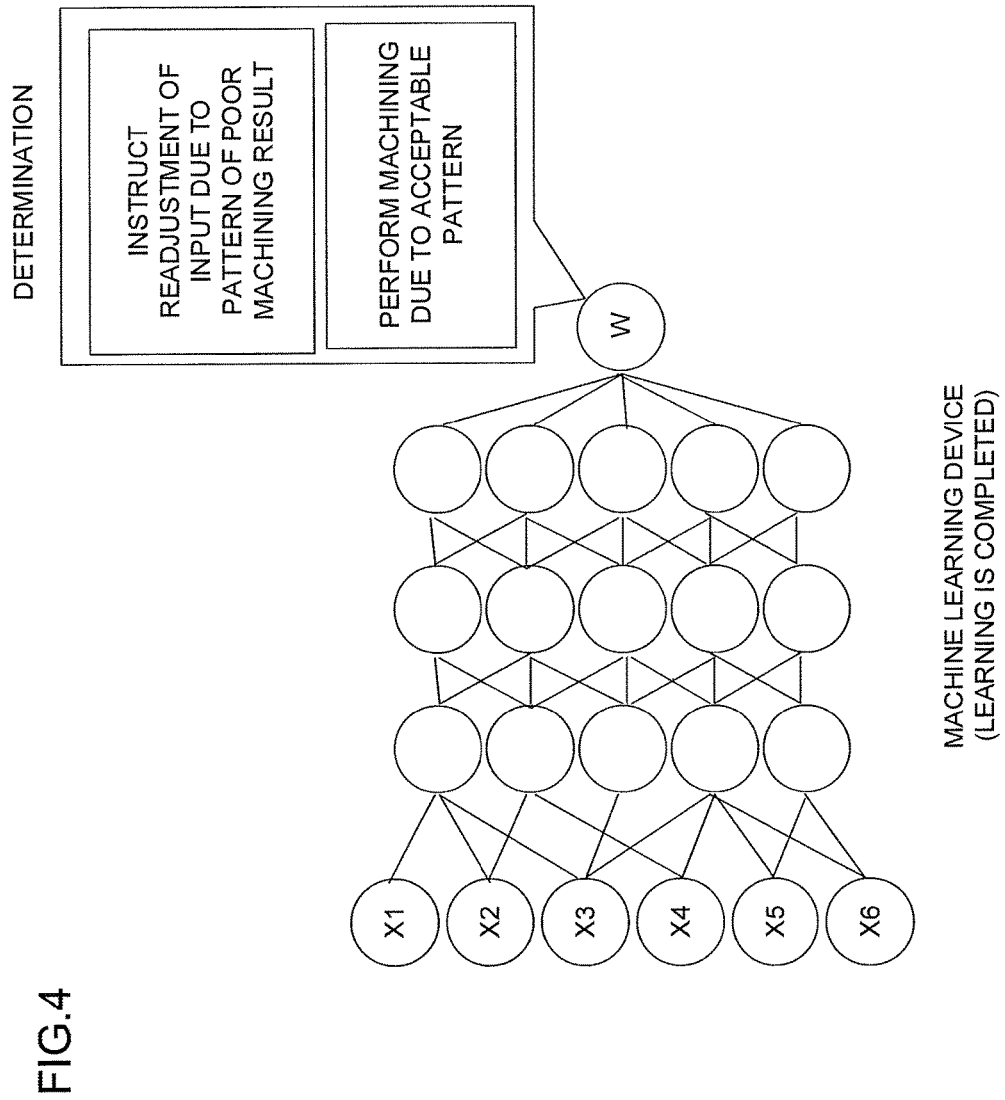
FIG. 4 illustrates a configuration example (operation phase) of the machine learning device introduced to the numerical controller according to the present invention.

As illustrated in FIG. 4, in the case where the multilayer neural network is used as the machine learning device of the numerical controller according to the present invention, the numerical controller inputs machining conditions into the machine learning device as input data (X1 to X6 in the example illustrated in FIG. 2) before machining in each step (at a time when a tool or a cutting condition is changed or at arbitrary timing) in the operation phase. As items of the machining conditions inputted into the machine learning device in the operation phase, items same as the items of the machining conditions used in the learning phase are used.

Subsequently, the numerical controller acquires the output data W, which is outputted from the machine learning device when the machining conditions serving as input data are inputted into the multilayer neural network, as a predicted machining result (an error of a predicted dimension of a machined workpiece with respect to a design, presence of a cutter mark, etc.).

Then, in the case where it is determined that a result of the machining is poor when the predicted machining result serving as output data is compared to a predetermined threshold value (an error of a predicted dimension of a machined workpiece with respect to a design is equal to or larger than a predetermined certain value, the number of cutter marks is equal to or larger than a predetermined number, the size of a cutter mark is equal to or larger than a predetermined size, etc.), the numerical controller according to the present invention determines that the machining result is a machining detect pattern and urges an operator to perform tool exchange.

Figure 5:
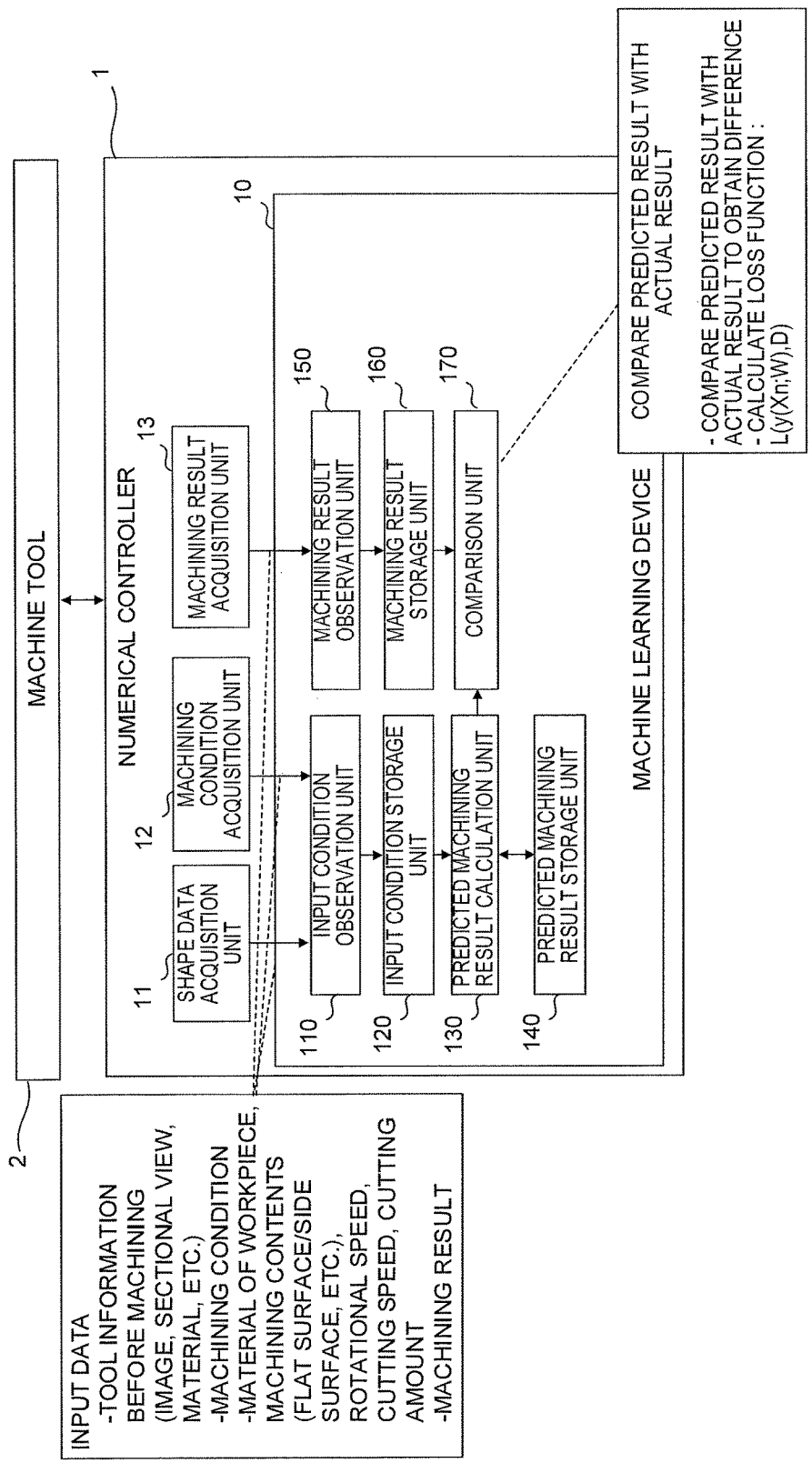
FIG. 5 is a diagram (1) which is a schematic functional block diagram, in the learning phase, of the numerical controller according to an embodiment of the present invention.
Figure 6:
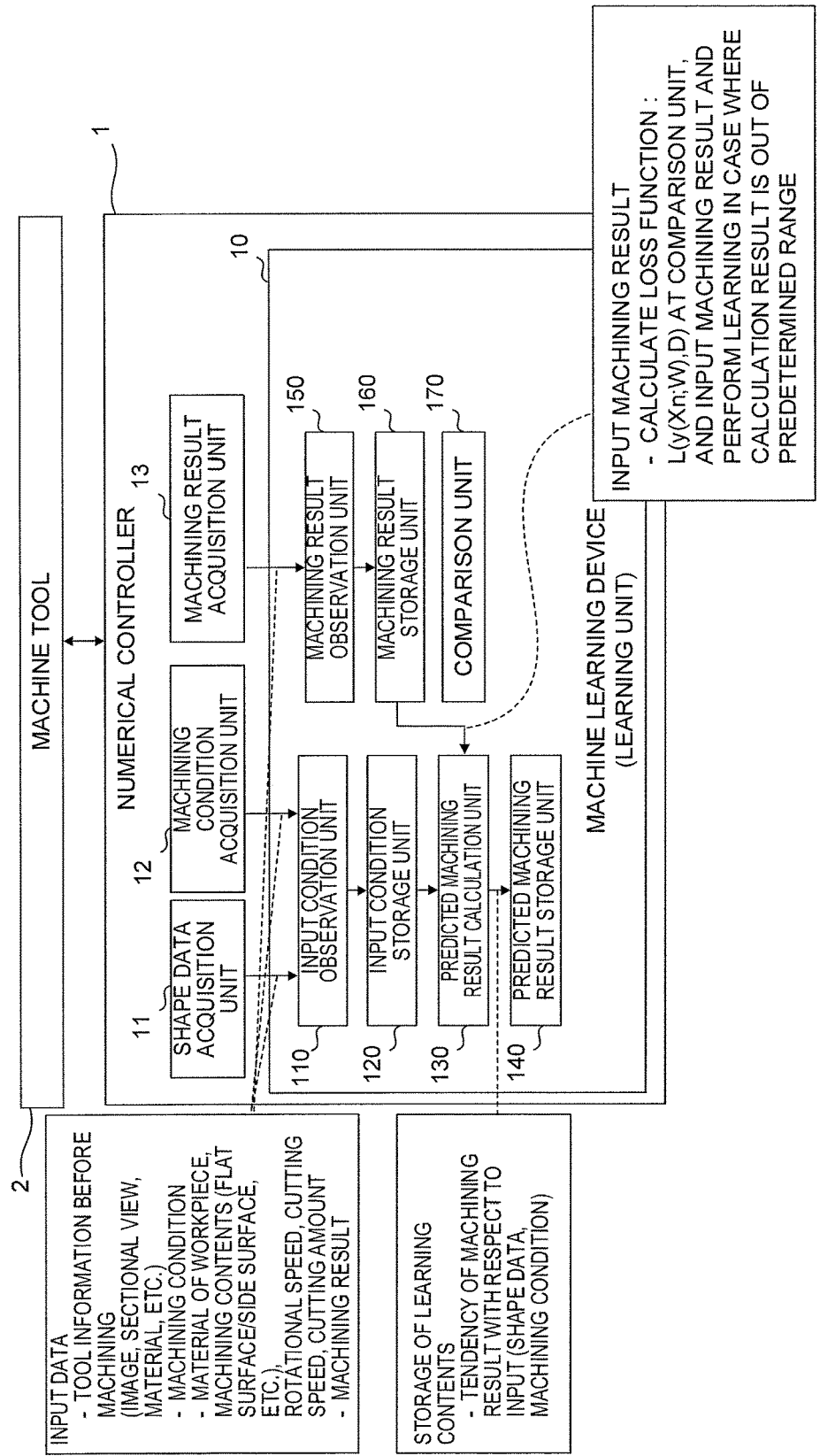
FIG. 6 is a diagram (2) which is a schematic functional block diagram, in the learning phase, of the numerical controller according to the embodiment of the present invention.
Figure 7:
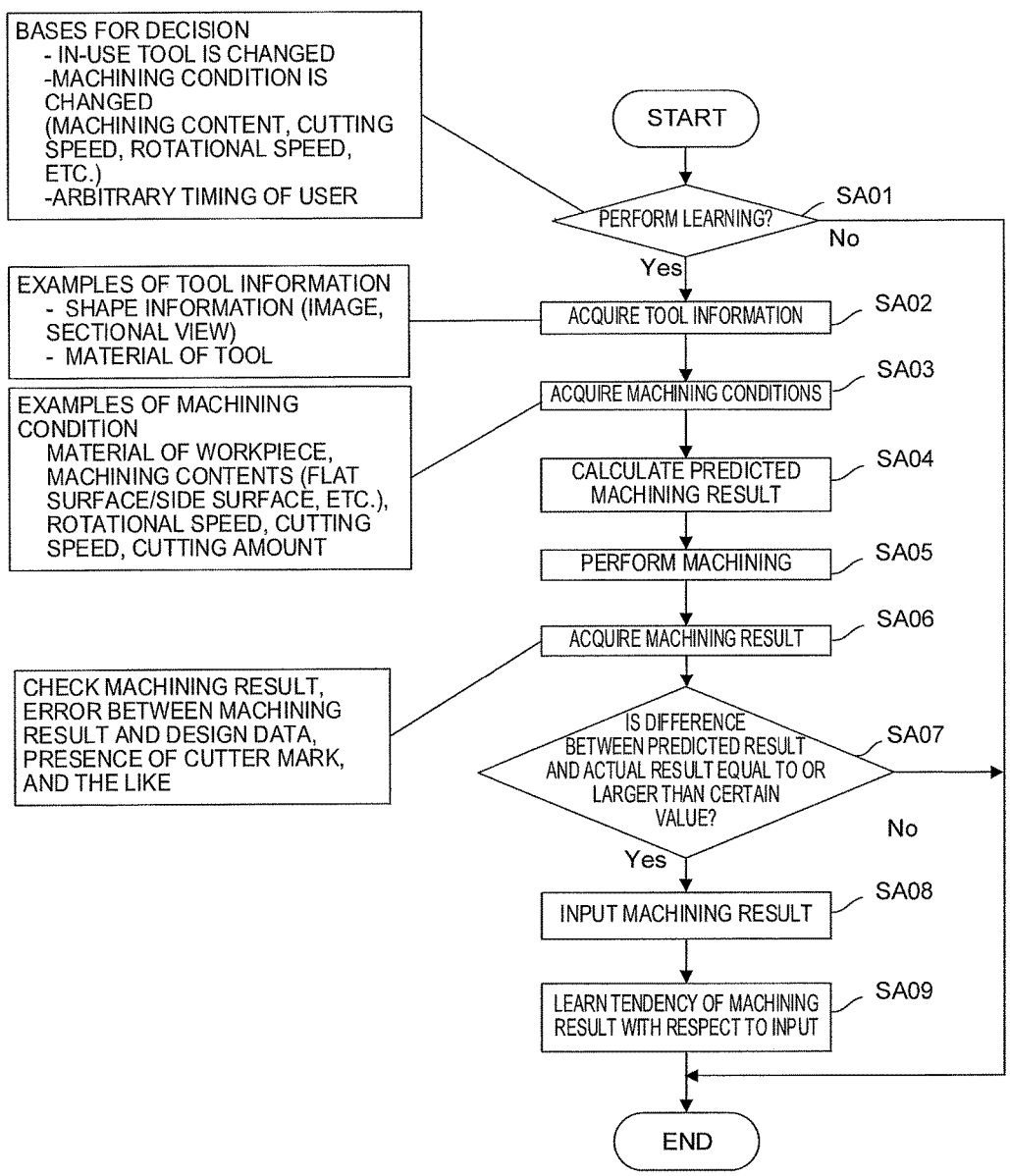
FIG. 7 is a flowchart illustrating an operation of the numerical controller illustrated in FIGS. 5 and 6.

FIGS. 5 and 6 are functional block diagrams illustrating essential parts of a numerical controller according to an embodiment of the present invention in the learning phase. Further, FIG. 7 is a flowchart illustrating a flow of an operation of a numerical controller 1 in the learning phase.

The numerical controller 1 according to the present embodiment includes a machine learning device 10, a shape data acquisition unit 11, a machining condition acquisition unit 12, and a machining result acquisition unit 13. Further, the machine learning device 10 includes an input condition observation unit 110, an input condition storage unit 120, a predicted machining result calculation unit 130, a predicted machining result storage unit 140, a machining result observation unit 150, a machining result storage unit 160, and a comparison unit 170.

The numerical controller 1 shifts to the learning phase and starts learning when the timing for performing learning of the machine learning device 10 comes (step SA01). Examples of timing to shift to the learning phase include a time at which an in-use tool is changed, a time at which a machining condition (a machining content, a cutting speed, a rotational speed, or the like) is changed, and arbitrary timing set by a user.

The shape data acquisition unit 11 and the machining condition acquisition unit 12 perform acquisition of tool information (shape information (an image, a sectional view), a material of a tool, etc.) and acquisition of machining conditions (a material of a workpiece, machining contents (flat surface/side surface, etc.), a rotational speed, a cutting speed, a cutting amount) respectively (steps SA02 and SA03). Tool information and machining conditions can be acquired based on set values or a machining program of the numerical controller 1 or input by an operator. Here, as for shape information and a material of a tool and a material of a workpiece, numbered values as illustrated in FIG. 3 are acquired. Especially, as for the shape information of a tool, a tool attached to a machine tool may be imaged by an imaging device, which is not illustrated, and image processing may be performed so as to acquire an image showing a shape of the tool to be used. Then, the acquired image may be matched with typical tool image data illustrated in FIG. 3 so as to use a number of image data showing the closest shape as the tool information.

The input condition observation unit 110 acquires the tool information acquired by the shape data acquisition unit 11 and the machining conditions acquired by the machining condition acquisition unit 12, as input conditions of the machine learning device 10. The input condition observation unit 110 observes acquisition states of respective data acquired by the shape data acquisition unit 11 and the machining condition acquisition unit 12. When at least one of the shape data acquisition unit 11 and the machining condition acquisition unit 12 acquires data, the input condition observation unit 110 acquires the data as input data.

The input condition storage unit 120 stores the input conditions acquired by the input condition observation unit 110 on a memory which is not illustrated. The input condition storage unit 120 may overwrite and store only the input conditions, which are observed and acquired by the input condition observation unit 110, among input conditions which are stored on the memory. Thus, only input conditions which are changed can be updated.

The predicted machining result calculation unit 130 calculates a predicted machining result based on the input conditions stored by the input condition storage unit 120 and a learning content (learning model) stored by the predicted machining result storage unit 140 (step SA04). The predicted machining result storage unit 140 is composed as a multilayer neural network, for example, as mentioned above.

After the numerical controller 1 machines a workpiece while controlling a machine tool 2 based on the machining conditions acquired by the machining condition acquisition unit 12 and a machining program which is not illustrated (step SA05), the machining result acquisition unit 13 acquires a machining result from the machined workpiece (step SA06). A machining result to be acquired includes an error between a dimension of the machined workpiece and a designed dimension, presence of a cutter mark, and the like.

The machining result observation unit 150 acquires the machining result, which is acquired by the machining result acquisition unit 13, into the machine learning device 10. The machining result observation unit 150 observes an acquisition state of each data acquired by the machining result acquisition unit 13. When a machining result is acquired, the machining result observation unit 150 acquires the data into the machine learning device 10.

The machining result storage unit 160 stores the machining result acquired by the machining result observation unit 150, on a memory which is not illustrated.

The comparison unit 170 compares the predicted machining result calculated by the predicted machining result calculation unit 130 with the actual machining result acquired by the machining result observation unit 150 (and stored by the machining result storage unit 160) and calculates a difference between the predicted machining result and the actual machining result by using a loss function so as to compare the difference with a predetermined threshold value (step SA07). In the case where the difference between the predicted machining result and the actual machining result is within the predetermined threshold value, learning is not performed. When the difference is equal to or larger than the threshold value, learning based on the predicted machining result and the actual machining result is performed and the obtained learning result is stored in the predicted machining result storage unit 140 (steps SA08 and SA09).

Figure 8:
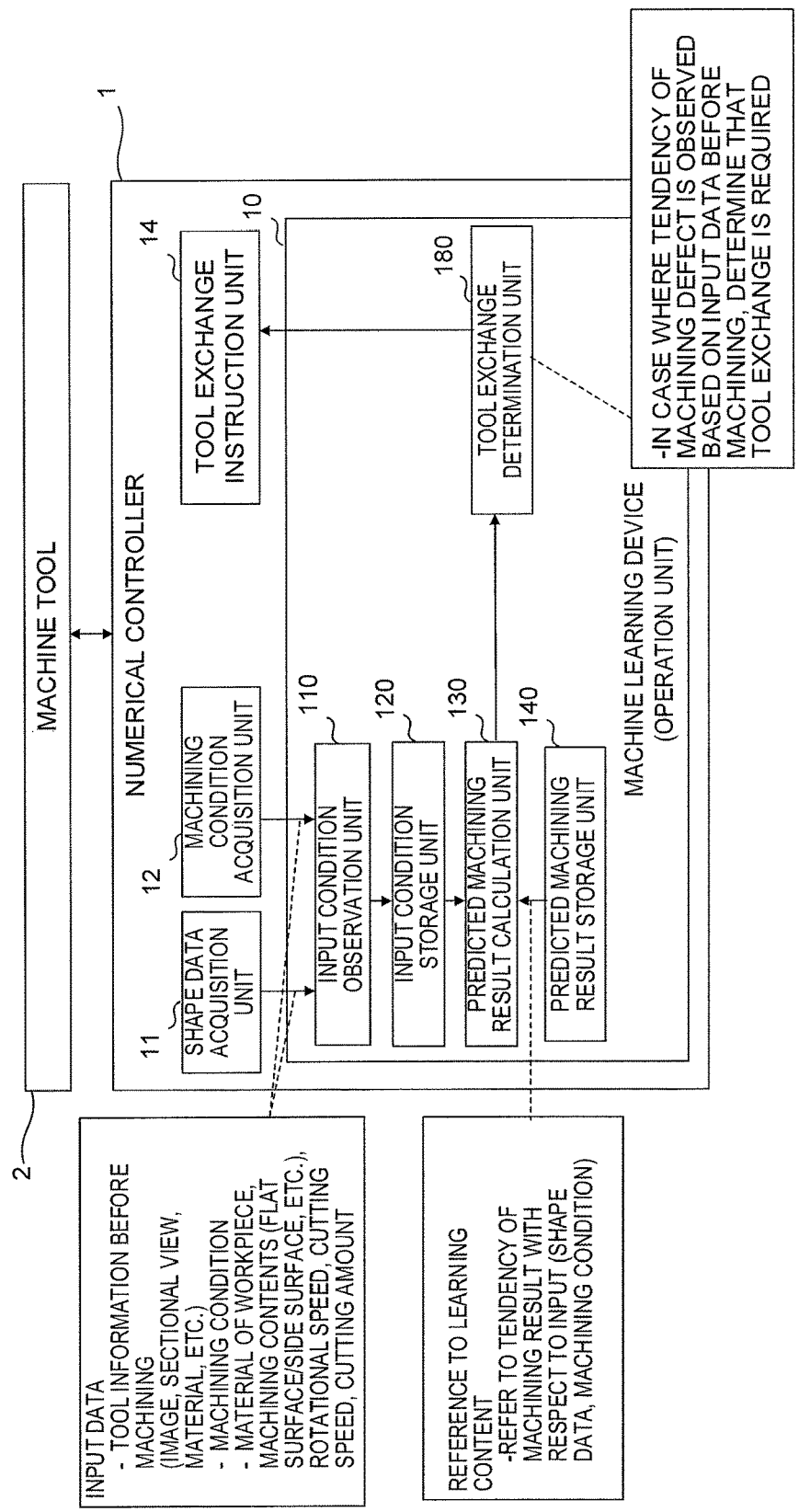
FIG. 8 is a schematic functional block diagram, in the operation phase, of the numerical controller according to the embodiment of the present invention.
Figure 9:
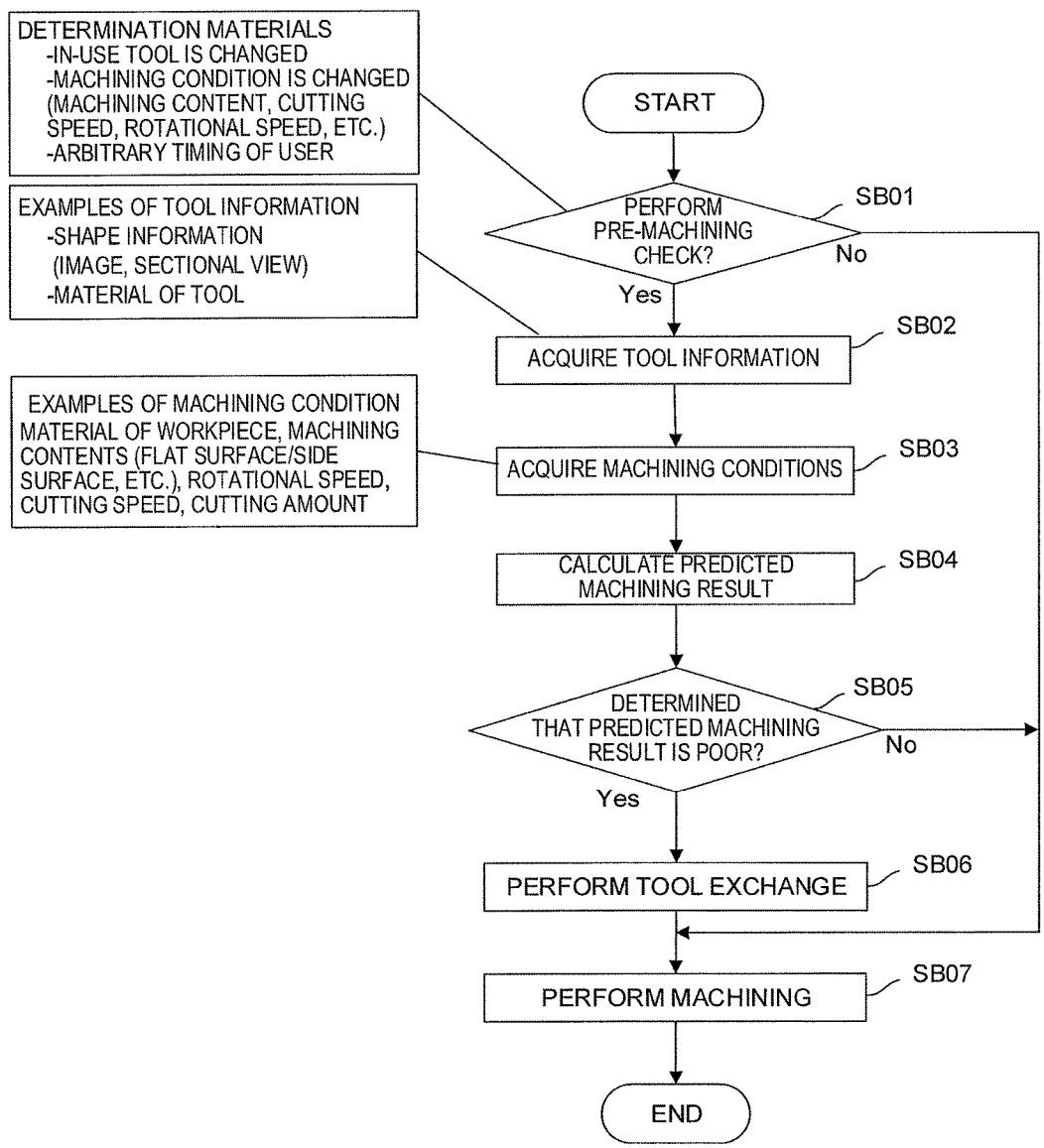
FIG. 9 is a flowchart illustrating an operation of the numerical controller illustrated in FIG. 8.

FIG. 8 is a functional block diagram illustrating essential parts in the case where the numerical controller 1 described in FIGS. 5 and 6 is allowed to operate in the operation phase. Further, FIG. 9 is a flowchart illustrating a flow of an operation of the numerical controller 1 in the operation phase. In the operation phase, the numerical controller 1 further includes a tool exchange instruction unit 14 and the machine learning device 10 further includes a tool exchange determination unit 180.

In the operation phase, the numerical controller 1 according to the present embodiment performs an operation of pre-machining check using the machine learning device 10 when the numerical controller 1 is in a state for performing the pre-machining check (step SB01). Examples of the state for performing the pre-machining check include a time at which an in-use tool is changed, a time at which a machining condition (a machining content, a cutting speed, a rotational speed, or the like) is changed, and arbitrary timing set by a user.

The shape data acquisition unit 11 and the machining condition acquisition unit 12 perform acquisition of tool information (shape information (an image, a sectional view), a material of a tool, etc.) and acquisition of machining conditions (a material of a workpiece, machining contents (flat surface/side surface, etc.), a rotational speed, a cutting speed, a cutting amount) respectively (steps SB02 and SB03).

The input condition observation unit 110 acquires the tool information acquired by the shape data acquisition unit 11 and the machining conditions acquired by the machining condition acquisition unit 12, as input conditions of the machine learning device 10.

The input condition storage unit 120 stores the input conditions acquired by the input condition observation unit 110 on a memory which is not illustrated.

The predicted machining result calculation unit 130 calculates a predicted machining result based on the input conditions stored by the input condition storage unit 120 and a learning content stored by the predicted machining result storage unit 140 (step SB04).

The above-mentioned operations by the shape data acquisition unit 11, the machining condition acquisition unit 12, the input condition observation unit 110, the input condition storage unit 120, the predicted machining result calculation unit 130, and the predicted machining result storage unit 140 are same as the operations performed by respective functional means in the learning phase.

The tool exchange determination unit 180 performs determination of tool exchange based on the predicted machining result calculated by the predicted machining result calculation unit 130. The tool exchange determination unit 180 refers to the predicted machining result outputted by the predicted machining result calculation unit 130 (an error between a dimension of a machined workpiece and a design value, presence of a cutter mark, etc.), and in the case where the result of the machining is poor (the error is equal to or larger than a predetermined certain threshold value, the number of cutter marks is equal to or larger than a predetermined number, the size of a cutter mark is equal to or larger than a predetermined size, etc.), the tool exchange determination unit 180 determines that the tool should be exchanged (step SB05).

Based on the determination result of the tool exchange determination unit 180, in the case where it is determined that the tool should be exchanged, the tool exchange instruction unit 14 instructs exchange of the tool (step SB06). The tool exchange instruction unit 14 may output a tool exchange instruction with respect to the machine tool 2 for automatic exchange of tools or may perform a display urging the tool exchange on a display device of an operation panel, which is not illustrated, so as to allow an operator looking at the display to exchange tools.

The embodiment of the present invention has been described thus far. However, the present invention is not limited to the above-described example of the embodiment but can be embodied by making alterations as appropriate.

For example, the example employing the multilayer neural network as the machine learning device 10 is described in the above embodiment. However, various methods such as the least squares method, the stepwise method, the SVM, and the decision tree learning are also well-known as algorithms of supervised learning, and any of these methods may be appropriately employed as the machine learning device 10 of the present invention.

Further, as described with reference to FIG. 3, images showing tool shapes need to be numbered and stored in advance in the numerical controller 1 according to the present invention. This numbering may be performed by manual operations, but more simply, automation may be realized such that clustering through unsupervised learning is performed with respect to a plurality of tool images, representative images are determined based on the result of the clustering, and numbering is performed with respect to each of the representative images.

Further, the operation of the numerical controller 1 in the learning phase and the operation of the numerical controller 1 in the operation phase are individually described with reference to FIGS. 5 to 9, but the learning phase and the operation phase may be executed in parallel. In such case, pre-machining check in the operation phase is performed and machining result information after completion of machining is acquired at the same time with the machine learning device whose learning is advanced to a certain level. In such state, in the case where a difference between a predicted machining result and an actual machining result is equal to or larger than a predetermined threshold value, learning may be performed with respect to the predicted machining result storage unit 140.

The invention claimed is:

1. A numerical controller which controls a machine tool machining workpiece with a tool, the numerical controller configured to:
   acquire tool information including a shape of the tool;
   acquire a machining condition in the machining of the workpiece; and
   acquire information related to a machining result of the workpiece after the machining of the workpiece; and
   wherein the numerical controller comprises a machine learning device which performs machine learning on tendency of the information related to a machining result with respect to the tool information and the machining condition based on the tool information and the machining condition used as input data and based on the information related to a machining result used as teacher data, so as to construct a learning model, and wherein
   the machine learning device is configured to determine whether or not a machining result is good by using the constructed learning model based on the tool information acquired by the shape data acquisition unit and the machining condition acquired by the machining condition acquisition unit, before the machine tool machines the workpiece.

2. The numerical controller according to claim 1, wherein the machine learning device constructs a learning model by a multilayer neural network.

* * * * *